United States Patent [19]
Ladd et al.

[11] Patent Number: 4,792,967
[45] Date of Patent: Dec. 20, 1988

[54] PBX DID AND E AND M TIE TRUNK INTEGRATION ADAPTER AND METHOD

[75] Inventors: David J. Ladd, Los Gatos; Stevan C. Smith, San Ramon, both of Calif.

[73] Assignee: Opcom, San Jose, Calif.

[21] Appl. No.: 831,177

[22] Filed: Feb. 20, 1986

[51] Int. Cl.⁴ .................... H04M 3/50; H04M 3/54; H04M 7/14

[52] U.S. Cl. ........................ 379/67; 379/84; 379/211; 379/213; 379/233

[58] Field of Search ............... 379/84, 88, 67, 213, 379/214, 233, 211

[56] References Cited

U.S. PATENT DOCUMENTS

| | | | |
|---|---|---|---|
| 3,571,517 | 3/1971 | Joel | 379/207 |
| 3,836,723 | 9/1974 | Ohara et al. | 379/207 |
| 4,256,928 | 3/1981 | Lesea et al. | 379/214 |
| 4,484,031 | 11/1984 | Gray et al. | 379/212 |
| 4,625,081 | 11/1986 | Lotito et al. | 379/88 |
| 4,629,831 | 12/1986 | Curtin et al. | 379/213 |
| 4,634,811 | 1/1987 | Curtin et al. | 379/211 |
| 4,672,660 | 6/1987 | Curtin | 379/88 |
| 4,674,116 | 6/1987 | Curtin et al. | 379/211 |

FOREIGN PATENT DOCUMENTS

| | | | |
|---|---|---|---|
| 3102476 | 8/1982 | Fed. Rep. of Germany | 379/213 |
| 0010956 | 1/1985 | Japan | 379/213 |
| 0074757 | 4/1985 | Japan | 379/213 |

OTHER PUBLICATIONS

Ishii et al, "Message Service by Automatic Intercept System", Japan Telecomm. Review, Jan. 1978, pp. 11–16.

*Primary Examiner*—Thomas W. Brown
*Attorney, Agent, or Firm*—Flehr, Hohbach, Test, Albritton & Herbert

[57] ABSTRACT

A private branch exchange (PBX) direct in dailing (DID) and an E&M tie trunk voice message integration adapter and method is disclosed. The invention permits a calling party on a DID line to a desired extension connected to a PBX to be automatically connected to the called party's mailbox in a VMS when the called extension is busy or does not answer.

10 Claims, 7 Drawing Sheets

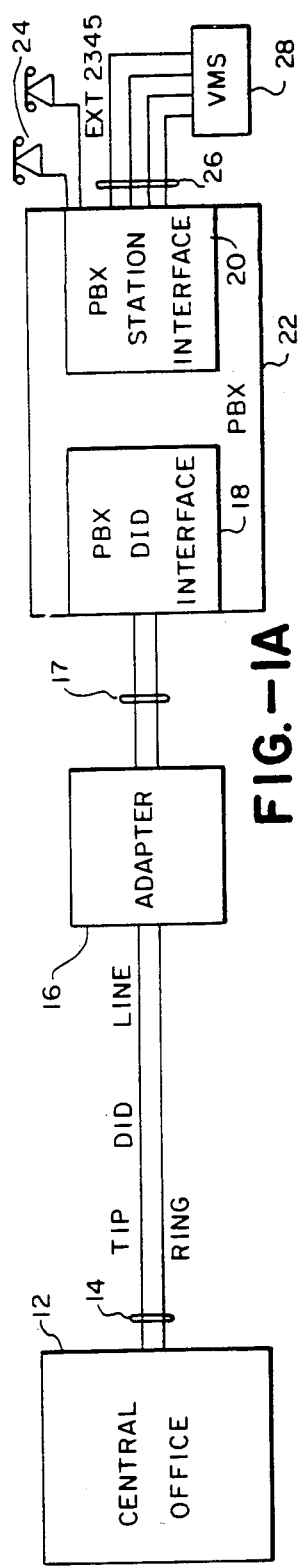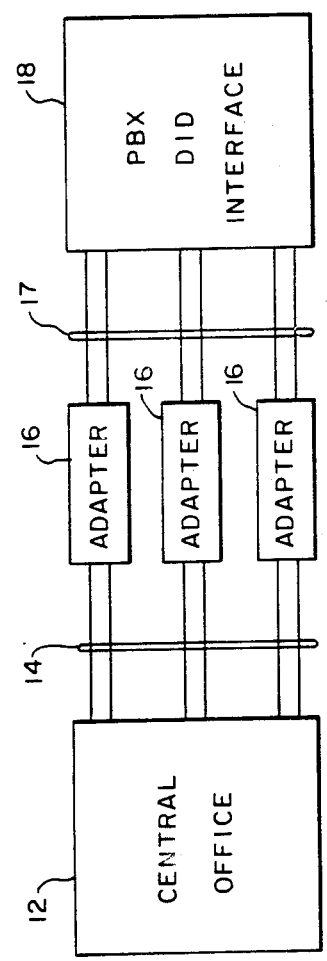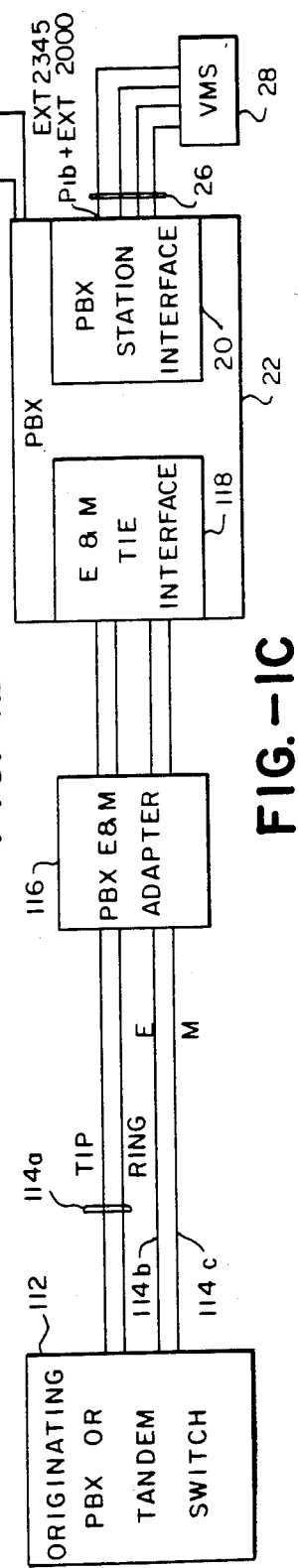

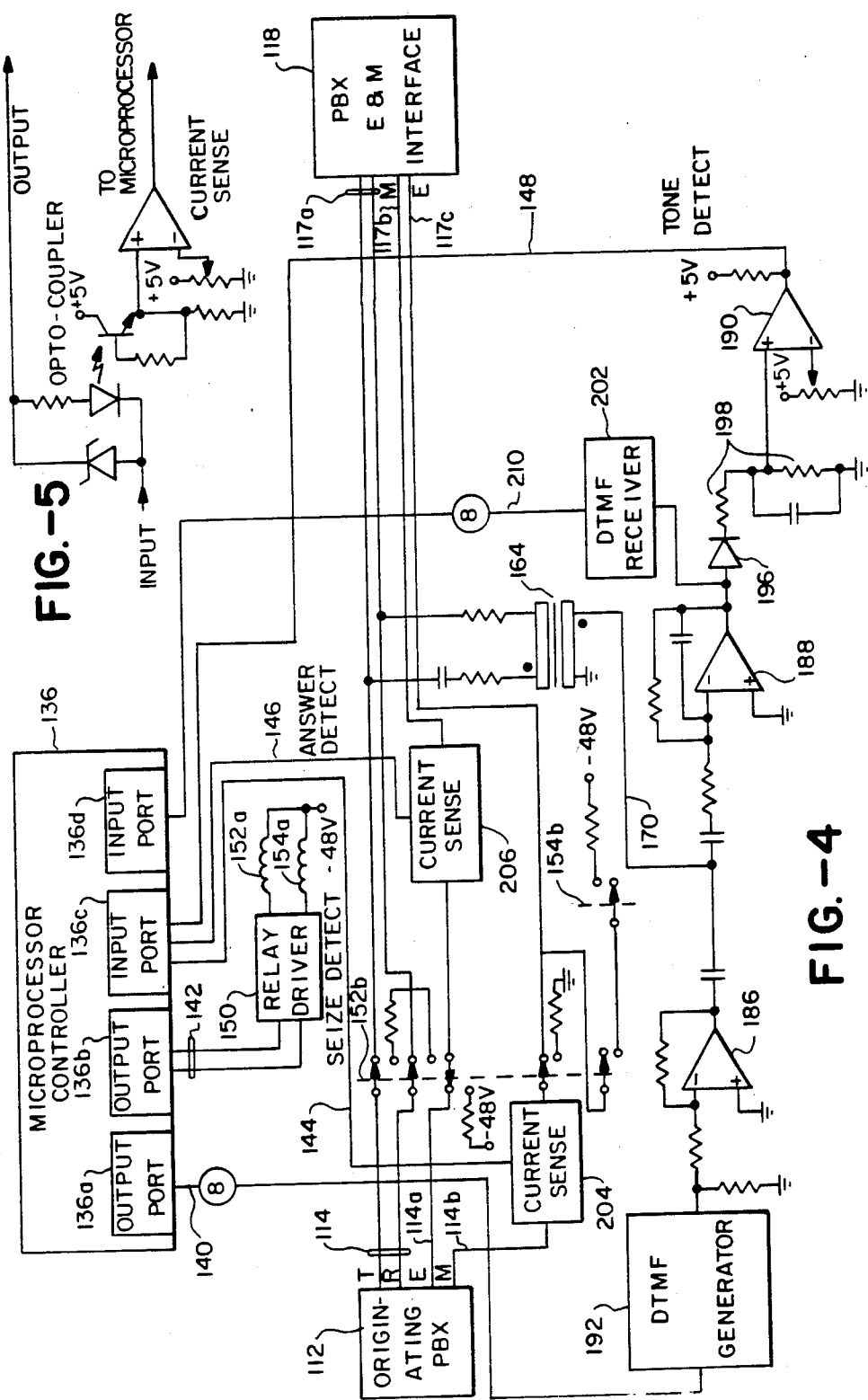

PBX DID AND E AND M TIE TRUNK INTEGRATION ADAPTER AND METHOD

BACKGROUND OF THE INVENTION

The present invention relates to PBX (Private Branch Exchange) equipment connected to a TELEPHONE COMPANY Central Office (CO) using Direct-In-Dialing (DID) trunk lines and/or E&M tie lines, where the PBX is in turn connected to a Voice Message System (VMS).

A PBX can be defined as a telephone exchange serving a single organization, having incoming and outgoing trunk lines from a Central Office, and extension lines connected to telephone extensions on the customer's premises. The PBX equipment provides for switching calls from the incoming lines to any of the extensions, switching calls between any two extensions, and switching calls between extensions and outgoing trunk lines to the CO. In most cases, a PBX has an attendant's console, which is used to extend incoming trunk line calls to extension lines. PBX equipment is, of course, well known in the prior art, as numerous manufacturers are providing many types of equipment for virtually every type of business environment.

A DID trunk line is a special facility available from the telephone company Central Office that requires special equipment in the CO and special DID trunk interfaces on the associated PBX. With DID, a party outside the PBX can call an extension in the PBX directly without going through the attendant's console. The outside party dials a 7- or 10-digit (the outside party may need to dial a "1" in front of area code) number, of which the last 3 or 4 digits are the actual extension number on the PBX. When the CO receives a call that is destined to a PBX with DID, it will signal or "pulse" the last 3 or 4 digits to the PBX over the DID trunk line to signal which extension to ring. The PBX receives these "pulsed" digits over its DID interface and connects the incoming DID trunk directly to try to ring the desired telephone extension.

An E&M tie trunk is used to connect two PBX's or a PBX to a tandem switch. An E&M tie line permits a user in one location to directly call those in another location without using the public switched network. The PBX's must be equipped with special E&M tie line interface circuits to connect to the E&M tie lines. The PBX receiving an incoming call over an E&M tie line will receive the digits corresponding to the extension being called. These digits can be received as "pulses" on the "E" lead or Dual Tone Multi-Frequency (DTMF) inband tone signals on the voice leads.

A Voice Message System (VMS) can be connected to a PBX and is used to record voice messages for specified users in what is known as the users' "mailbox." In most cases, the caller uses a Dual Tone Multi-Frequency (DTMF or "Touch Tone") telephone to enter the mailbox or extension number of the person the caller wishes to leave a message for. There is a need to use a VMS to record a message when a call to a particular telephone extension on the PBX is not answered or is busy.

In the current art, this can be done by instructing the PBX, on busy or ring-no-answer calls to an extension, to forward the call to another group of extensions. Connected to this group of extensions are the ports of a VMS. When the VMS receives a call, it will prompt with something like "YOU HAVE REACHED THE ABC COMPANY MESSAGE CENTER, PLEASE RE-ENTER THE LAST THREE DIGITS OF THE NUMBER YOU WERE TRYING TO REACH." If the caller has a DTMF-equipped phone, he enters what is essentially the extension number he was trying to call, and the VMS can then record a message to be stored in the voice mailbox corresponding to that extension. There are several problems with this method.

First, some PBX's do not support forwarding of calls on busy and/or ring-no-answer to a group of extensions; second, the caller finds it awkward and inconvenient to have to enter the extension number; and third, the caller may have a rotary dial phone, in which case the VMS cannot receive the extension number.

In some cases, the PBX software program can be modified to automatically send the called station identification to the VMS when a call to a called extension is ring-no-answer or busy forwarded. However, this requires the cooperation of the PBX manufacturer and modification of the PBX, and is rare.

It would therefore be desirable to provide an apparatus and a method to operate on any PBX using DID incoming trunk lines or E&M tie lines and a Voice Message System, such that when the extension called by an incoming DID trunk line or E&M tie line does not answer or is busy, the line will be automatically connected to the Voice Message System, and the called station extension number will be automatically sent in DTMF format to the VMS, so a message can be recorded for the specific called party and then the message can be put in the proper "mailbox" associated with the desired extension number.

SUMMARY OF THE INVENTION

In two preferred embodiments of the present invention, a PBX DID and E&M tie line Voice Message Integration Adapter (hereinafter called "adapter") are disclosed. The adapters are intended to be used for calls coming into a PBX on a DID trunk or E&M tie line. The called extension number, as it is "dial pulsed" to the PBX by the Central Office or sent on an E&M tie line as "dial pulse" or DTMF, is monitored and accumulated by the adapter. The adapter also monitors the tone cadences returned to the calling party on the DID trunk or E&M tie line to determine if the called extension is busy (busy tone returned) or ringing (ring-back tone returned). If answer is detected, the adapter monitors for call termination and the initiation of a new call. If the tone returned is detected as busy or the adapter detects ring-back tone and the telephone does not answer after, in one example, three rings (determined by a parameter in the software program on the adapter), the adapter will "hold" the DID line up to the Central Office or E&M tie line to the originating switch. This action makes it look as though the DID trunk or E&M tie line has not yet been answered by the PBX. The adapter then goes "on-hook" (hang-up), terminating the call to the PBX. The adapter will then go "off-hook" (appear to initiate a new incoming call) to the PBX, and the adapter will then "dial-pulse" or DTMF the desired extension number that will call one of the group of extensions connected to the VMS. When the adapter detects that the VMS has answered, it will send, in DTMF, the digits corresponding to the extension number it accumulated when monitoring the DID or E&M tie line call. It will then connect the incoming CO side of the DID line or E&M tie line (which was being held up by the adapter) through to the PBX and thus to the VMS. The VMS will be responsible for its normal function of telling the caller that the called extension was not available (or playing a greeting pre-recorded by the extension user) and recording a message for the extension called. At this point the adapter monitors for call termination and a new incoming call. There is almost always more than one incoming DID trunk or E&M tie line into a PBX. Typically, there would be one adapter connected per DID trunk or E&M tie line. Additionally, one microprocessor could be shared to handle multiple DID trunk or E&M tie lines.

BRIEF DESCRIPTION OF THE DRAWINGS

FIG. 1A depicts a block diagram of a PBX DID Voice Messaging integration Adapter (for use with DID type lines), according to the present invention, connected between a Central Office and a PBX equipped with a Voice Message System (only one DID trunk is shown).

FIG. 1B depicts how multiple adapters, according to the present invention, would be connected to multiple DID incoming trunk lines to a PBX DID interface.

FIG. 1C depicts a block diagram of a PBX E&M tie line Voice Message Integration Adapter.

FIG. 3A also shows the program for waiting for termination of a call in progress.

FIG. 3C also shows the program to dial-pulse or DTMF the extension number of the VMS pilot number to divert the call to the VMS.

FIG. 4 is a more detailed diagram of the E&M tie embodiment of the adapter from FIG. 1C.

FIG. 5 is a schematic diagram of the current sense circuit of FIG. 4.

DESCRIPTION OF THE DID PREFERRED EMBODIMENT

Figure 2:
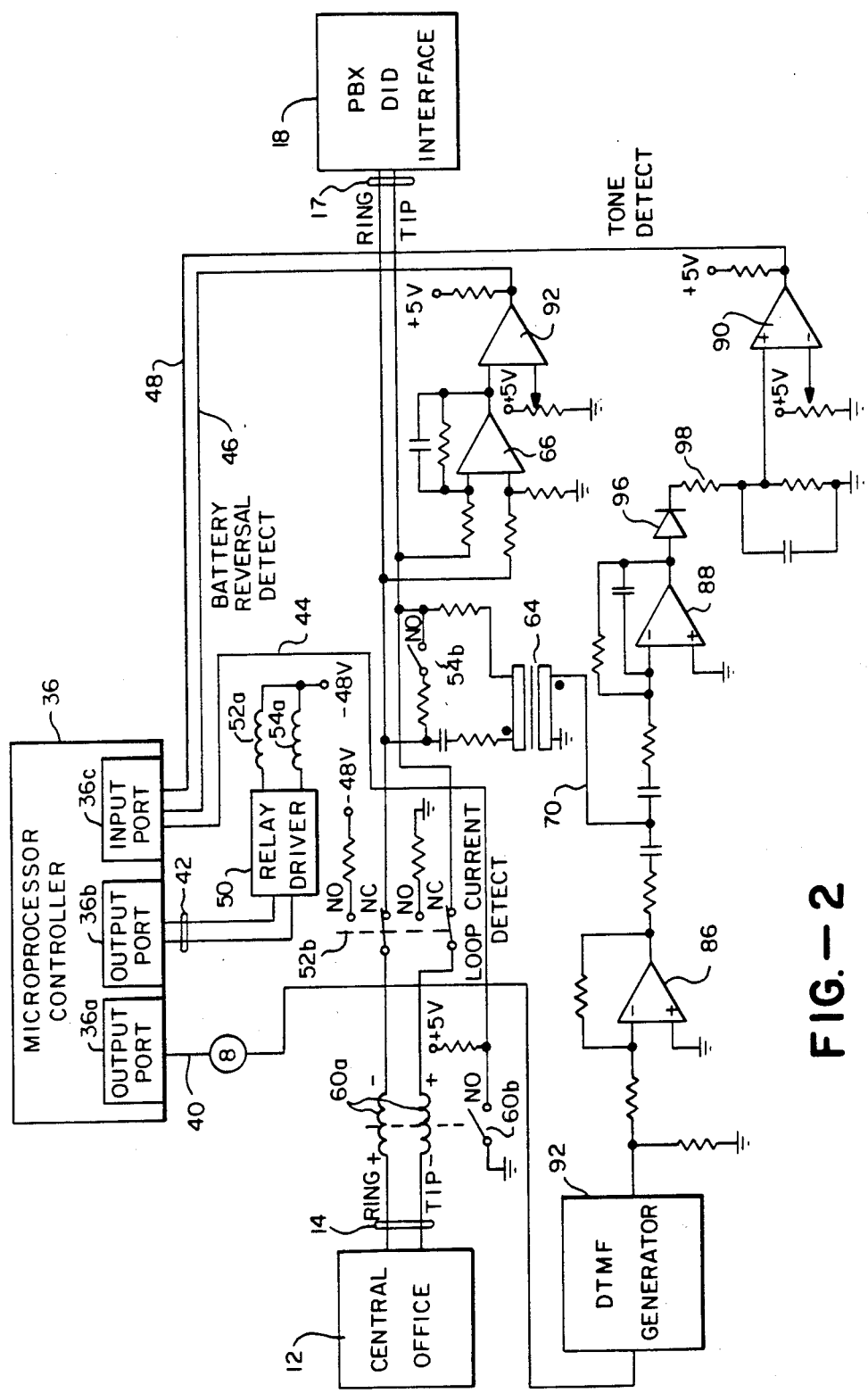
FIG. 2 is a more detailed diagram of the adapter of FIG. 1A.

Referring to FIG. 1A, a PBX DID Voice Message Integration Adapter (hereinafter "ADAPTER") is identified by the reference number 16. Only one DID trunk line 14, consisting of two wires (called Tip and Ring, or T and R) from the Central Office 12 is shown going into one adapter 16. There is an identical adapter 16 for each DID trunk line 14 from the Central Office 12 to the PBX interface 18, as shown in FIG. 1B. The adapter 16 shown in FIG. 1 is connected in series with the two wires of the DID trunk line 14 and thus is connected to the PBX DID Interface 18 in the PBX 22 via wire pair 17. The PBX 22 in FIG. 1A has connected to it station interface 20, extension telephones 24 and Voice Message System 28 via station wire pairs 26. For purposes of illustration, one of the telephones 24 is shown as having extension number 2345 and the group of stations going to VMS 28 has "pilot" number 2000. (A pilot number of a group of extensions functions such that a call to the pilot number will ring the first or any non-busy extension in the group.)

Referring to FIG. 2, a call coming in from the CO 12 is signaled by drawing loop current through the tip and ring wires 14 that in the idle state of the adapter are connected through to the PBX DID interface 18 as shown. The PBX DID interface 18 provides the voltage/current (−48 volts is supplied and is called "talk battery") to the CO 12 in this condition. The CO may pulse the extension number digits immediately or wait for a "wink start signal" from the PBX. A wink start signal is a momentary reversal of the −48 volts (called battery reversal) supplied by the PBX. The reversal is usually about 200 ms long to indicate a "wink" start.

When the CO 12 closes the loop and draws current from the PBX DID interface 18, the relay coils 60a will be activated and close relay contact 60b, which will provide an input signal on lead or line 44 to the microprocessor controller 36 via one of its input ports 36C.

The microprocessor controller is typically a well known single chip processor, such as the Intel 8051 with on-board ROM, RAM, timer, and at least two output ports for driving eight output lines on line 40, and two on the other line 42, and an input port for reading the status of three TTL compatible input lines 44, 46, 48.

When the CO "dial-pulses" the digits of the desired extension, it interrupts the closed loop of the DID trunk line pair 14, which will momentarily open relay contacts 60b, which is monitored by the microprocessor controller 36 via line 44 to its input port 36C, as described above. "Dial-pulse" digits are sent by the CO on tip-ring pair 14 typically in the following format:

Ten pulses per second with a 60% make and 40% break ratio of on (drawing current) to off (no current drawn). There is nominally 600 ms interdigit time. Digit one is thus a 40 ms interruption of the tip and ring 14 loop. Digit two is a 40 ms interruption, 60 ms restore, 40 ms interruption and 600 ms restore of loop current. Similarly, digit 0 is ten pulses.

Figure 3A:
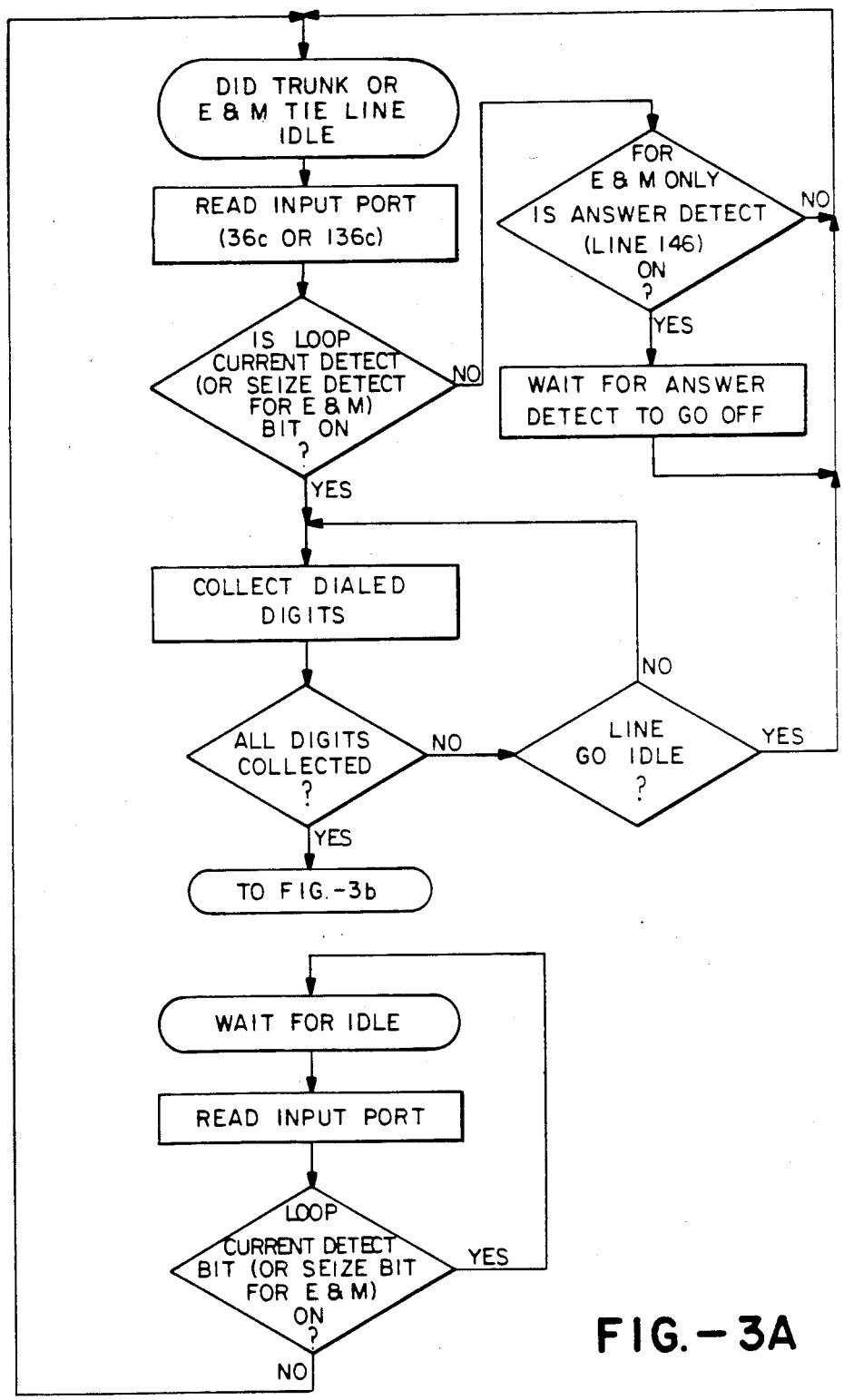
FIG. 3A is a flow chart of a microprocessor controller showing the program for detection of a new call from the Central Office or PBX and collection of the dialed (from the CO or originating PBX) extension number.

FIG. 3A shows a suitable software program flow chart for seeing the CO originate a call and collecting the extension number as it is pulsed by the CO.

Figure 3B:
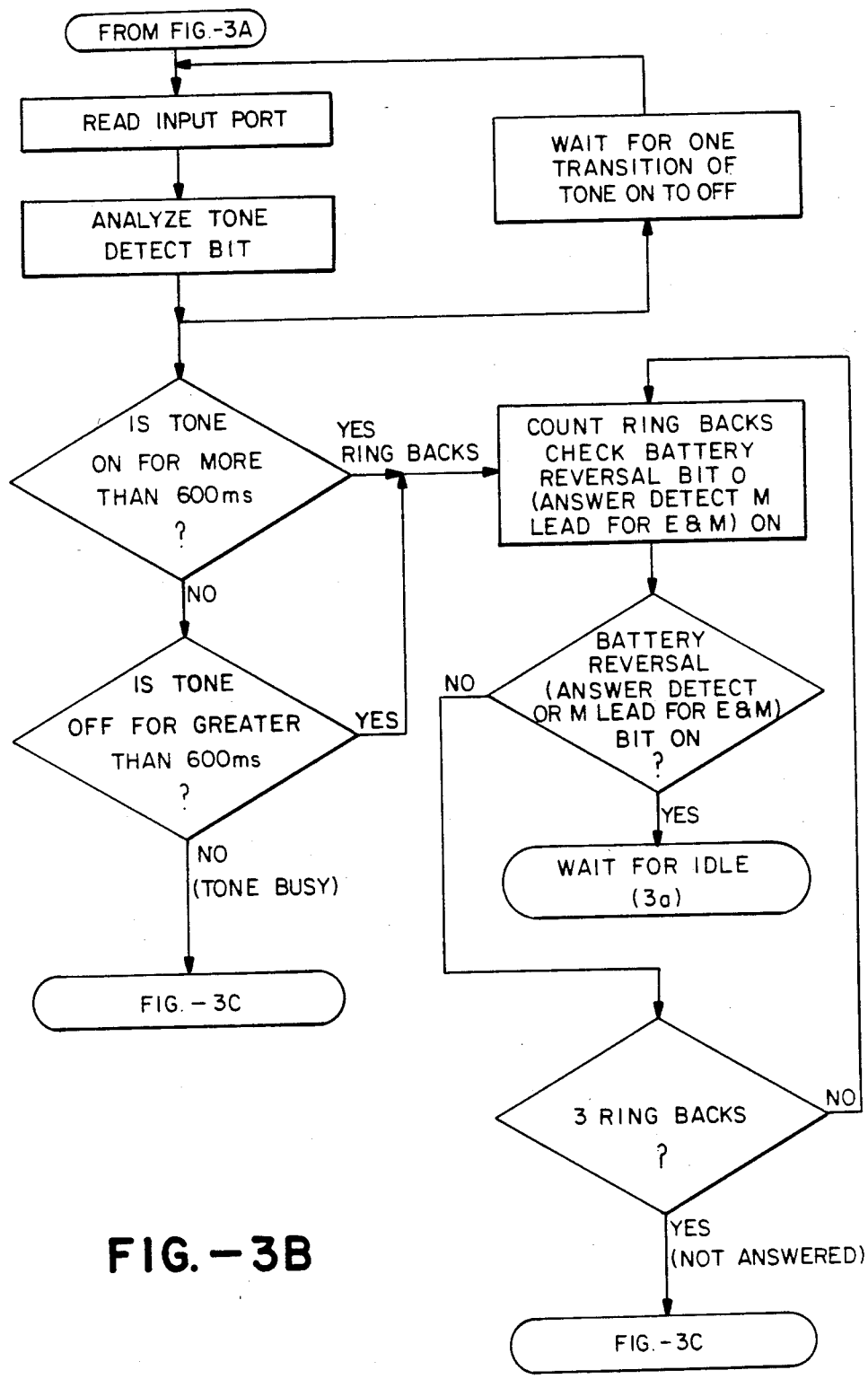
FIG. 3B is a flow chart of a microprocessor controller showing the program for analysis of the tone returned from the PBX to determine if it is ring-back or busy, to count the number of ring-backs and to see if the called extension answers.

After the CO has completed pulsing the called extension number, the PBX 22 of FIG. 1 will attempt to ring the extension telephone 24 (say, extension 2345) through the PBX station interface 20. Ring-back or busy tone will be returned by the PBX 22 through the PBX DID Interface 18, depending on the state of the called extension 24. The tone (ring-back or busy) is detected through transformer 64 of FIG. 2, connected across tip and ring 17 in FIG. 2 and then connected through line 70 to the amplifier/filter 88 to increase the gain of the tone signal from the PBX 18, which is then rectified by diode 96 and normalized to 5 volts using resistors 98 to feed comparator 90. The microprocessor controller 36 of FIG. 2 can read the TONE 48 input line through its input port 36C to see if the tone is on or off. The microprocessor controller 36 will lokk at the tone on and off timings of the tone signal from the PBX to determine if it is busy or ring-back tone. Busy tone is 500 ms on, 500 ms off, etc.; any other tone is assumed to be ring-back (usually one second on and four seconds off) and the ring-back sequences are counted. The flow chart in FIG. 3B shows a suitable microprocessor controller software flow chart to perform this function.

If the call is answered by one of the telephone extensions 24, in FIG. 1, the adapter circuit 16 will see "battery reversal" via (FIG. 2) voltage translator 66, comparator 92, and line 46 to microprocessor controller 46 input port 36C. A suitable software flow chart for this function is also shown in the flow chart in FIG. 3B.

Figure 3C:
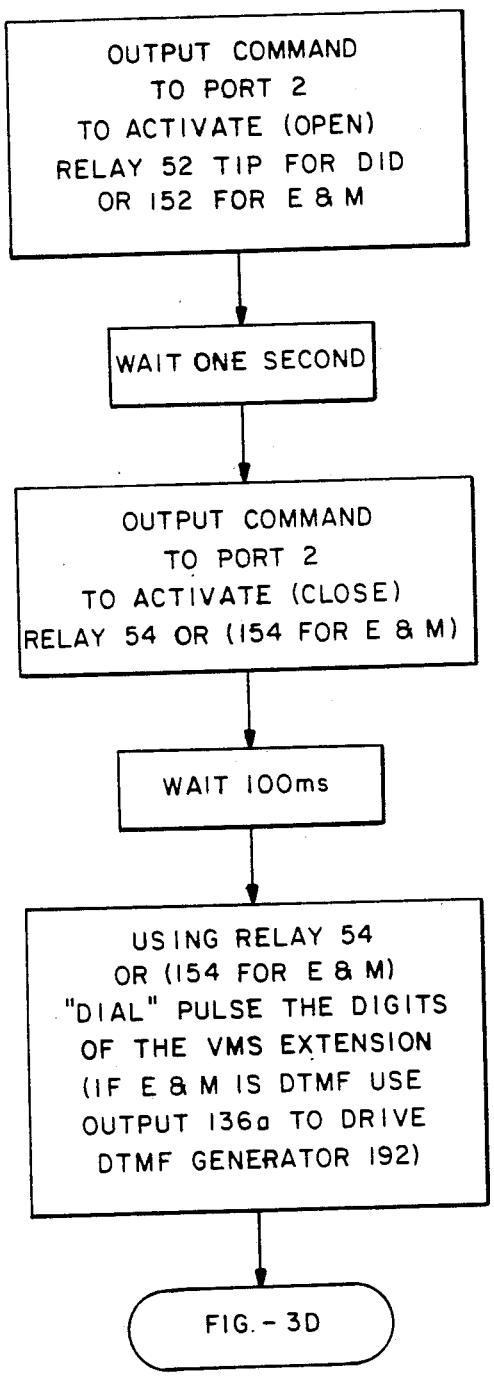
FIG. 3C is a flow chart of a microprocessor controller showing the program to "hang-up" the call to the PBX while holding the DID line to the CO or E7m tie line to the originating PBX, so the CO or PBX does not see the hang-up, and the program to originate the new call to the PBX.

Referring to FIG. 2, if the called extension is busy or does not answer after three rings, the microprocessor controller program (see flow chart, FIG. 3C) will use the microprocessor controller output port 36B via lines 42 to select a specific relay driver 50 to activate relay coil 52A to open contacts 52 which connect the central office 12 DID tip and ring lines 14 to −48 volts to "hold" the line off-hook to the CO 12. This also causes the PBX to see the "loop" that the CO had closed, open and thus looks as though the calling party on the DID trunk line 17 to the PBX has hung up.

The microprocessor controller 36 must wait one second to make sure that the PBX sees the "hang-up" of the DID trunk line and then the microprocessor controler 36 uses its output port 36b to have relay driver 50 activate relay coil 54a which closes relay contacts 54b. This makes the PBX DID interface 18 think a new DID call is being originated by the DID trunk line 17. Depending on the type of signaling used by the PBX as described previously, the microprocessor controller will wait 1 sec and then use relay 54 to "dialpulse" the digits corresponding to the pilot number of the group of extensions 26 connected to the VMS 26 (e.g., 2000), or it will wait until the PBX signals a "wink" by reversing the −48 volts (detected by voltage translator 66, comparator 92, via line 46 to microprocessor controller 36 and its input port 36c as previously described). The extension number is "dial-pulsed" using relay 54 in conjunction with a suitable software program flowcharted in FIG. 3C.

After pulsing the extension number of the VMS, the microprocessor controller 36 waits for one of the ports of the VMS 28 connected to the PBX via extensions 26 to answer. When it answers, the PBX will reverse the −48 volts on line 17, which will be detected by voltage translator 66, comparator 92, via line 46 to microprocessor controller 36 and its input port 36c as previously described above.

Figure 3D:
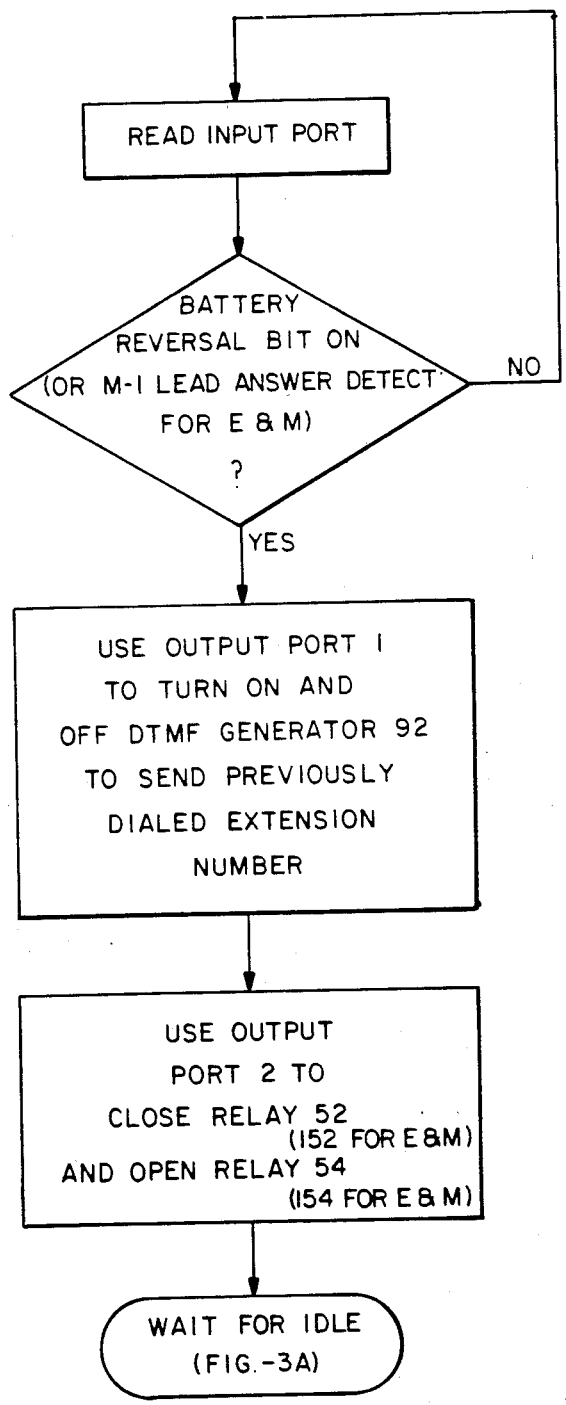
FIG. 3D is a flow chart of a microprocessor controller showing the program to detect the VMS answering, sending it in DTMF the extension number of the originally called extension, and connecting the DID or E&M tie trunk through to the VMS.

The microprocessor controller 36 will then use output port 36a to activate DTMF generator 92 to send the digits of the original extension number it received from the CO to the PBX in DTMF. The suitable program flow chart in FIG. 3D shows the necessary details to send the digits at the rate of 100 ms tone on and 100 ms tone off.

Once the digits have been sent, the microprocessor controller 36 uses output port 36b via lines 42 to deactivate relay driver 50 to deactivate relay 52b and thus connect the CO tip and ring lines 14 through to the PBX DID interface 18, and deactivate relay 54 to disconnect the adapter 16 from drawing the loop current. This is also shown in FIG. 3D.

At this point, the microprocessor controller 36 uses input port 36c to monitor the current detect line 44 to see if relay 60 opens. This occurs when loop current goes away signaling the call termination. This is also shown in the flow chart in FIG. 3A.

DESCRIPTION OF THE E&M PREFERRED EMBODIMENT

Referring to FIG. 1C, a PBX E&M voice message integration adapter (hereinafter "adapter") is identified by the reference number 116. Only one E&M trunk line 114 consisting of four wires (called tip and ring or T and R and E and M) from the originating PBX or tandem switch 112 is shown going into one adapter 116. Some E&M tie trunks are six wires called E, M, T1, R1, T2 and R2. The T1, R1 and T2 R2 are actually a separation of the transmit and receive voice signals onto separate pairs of wires. If this type of E&M tie trunk is used, there will be a separation of the components which detect the DTMF signals from the originating PBX 112 and those that detect tone and send DTMF signals to the destination PBX 118. There is an identical adapter 116 for each DID trunk line 114 from the originating PBX 112 to the PBX. The adapter 116 shown in FIG. 1C is connected in series with the four wires of the E&M trunk line 114 and thus is connected to the PBX E&M interface 118 in PBX 22 via four wires 117. The PBX 22 in FIG. 1C has connected to it station interface 20, extension telephones 24 and voice message system 28 via station wire pairs 26. For purposes of illustration, one of the telephones 24 is shown as having extension number 2345 and the group of stations going to the VMS 28 has "pilot" number 2000. (A pilot number of a group of extensions functions such that a call to the pilot number will ring the first or any non-busy extension in the group.)

Referring to FIG. 4, a call coming in from the originating PBX 112 is signaled by drawing current through the M lead 114b that in the idle state of the adapter is connected through the current sense circuits 204 to the PBX DID interface 118 as shown. The current sense circuits 204, 206 of FIG. 4 are shown in more detail in FIG. 5. Referring again to FIG. 4, the originating PBX may send the extension number digits immediately or wait for a "wink start signal" from the PBX. A wink start signal is a momentary drawing of current on the E lead 114a by the PBX E&M interface. The current is drawn usually about 200 ms long to indicate a "wink" start. The particular E&M tie line may signal the extension using momentary interruptions of the M lead (pulse signaling as for the DID adapter) or use DTMF. When the originating PBX 112 activates the M lead signal 114b, the seize detect current sense circuit 204 detects it and provides an input signal to the microprocessor controller 136 via one of its input port 136c. The microprocessor controller is a single chip processor such as the Intel 8051 with on-board ROM, RAM, timer, and at least two output ports for driving eight output lines on one and two on the other, and two input ports, one for reading the status of three TTL input lines and the other for reading the status of the eight lines from a DTMF decoder chip 202. When the originating PBX 112 sends the digits of the extension using pulses, it interrupts the M lead 114b which is monitored by current sense circuit 204 and to the microprocessor controller 136 via line 144 to its input port 136c as described above. "Dial-pulse" digits are sent as previously described for the DID embodiment. If the originating PBX uses DTMF to send the extension, the DTMF receiver 202 connected through the eight lines 210 to the microprocessor input port 136d will decode the digits as they are sent by the PBX. The register is connected to the T and R lines 114 through amplifier/filter 188 and transformer 164 on line 170. FIG. 3A shows the software program flow chart for seeing the originating PBX originate a call and collecting the extension number as it is pulsed or sent in DTMF by the PBX.

After the originating PBX 112 has completed sending the called extension number, the PBX 22 of FIG. 1C will attempt to ring the extension telephone (say, 2345) 24 through the PBX station interface 20. Ring-back or busy tone will be returned by the PBX 22 depending on the state of the called extension 24. The tone is detected through transformer 164 of FIG. 4 connected across tip and ring in FIG. 4, and then connected through line 170 to the amplifier/filter 188 to increase the gain of the tone signal from the PBX 22, which is then rectified by diode 196 and normalized to 5 volts using resistors 198 to feed comparator 190. The microprocessor controller 136 of FIG. 4 can read the tone 148 input line through its input port 136c to see if the tone is on or off. The microprocessor controller 136 will look at the tone on and off timings of the tone signal from the PBX to determine if it is busy or ring-back tone. Busy tone is always 500 ms on and 500 ms off; any other tone is assumed to be ring-back (usually one second on and four seconds off) and the ring-back sequences are counted. The flow chart in FIG. 3B shows the microprocessor controller software to perform this function.

If the call is answered by one of the telephone extensions 24, in FIG. 1C, the adapter circuit will see current sense via circuit 206 connected via line 146 to microprocessor controller 136 via port 136c. The software for this function is also shown in the flow chart in FIG. 3B.

If the called extension is busy or does not answer after three rings, the microprocessor controller program (see flow chart 3c) will use the microprocessor controller output port 136b via lines 142 to select a specific relay driver 150 to activate relay coil 152a to activate contacts 152b as shown in FIG. 4 to "hold-up" the lines to the originating PBX 122. This also causes the PBX E&M tie interface 118 to see the E&M tie trunk disconnect and thus looks like the calling party on the E&M tie trunk line 117 to the PBX has hung up. The microprocessor controller must wait one second to make sure the PBX sees the "hang-up" of the tie line and then the microprocessor controller 136 uses its output port 136b to have relay driver 150 activate relay coil 154a which opens relay contacts 154b connecting line 117c to −48 volts. This makes the PBX E&M tie interface 118 think a new call is being originated by the tie line. Depending on the type of signaling used by the PBX as described previously, the microprocessor controller will wait 100 ms and then will either use relay 154 to "dial-pulse" or the DTMF generator 192 to send the digits corresponding to the pilot number of the group of extensions 26 connected to the VMS 26 (e.g., 2000) or it will wait until the PBX signals a "wink" as described previously. The extension number is sent using the program flow-charted in FIG. 3C.

After sending the extension number of the VMS, the microprocessor controller waits for one of the ports of the VMS 28 connected to the PBX via extensions 26 to answer. When it answers, the PBX will draw current on the lead 117b which will be sensed using current sense circuit 206 connected to the microprocessor via line 148 to port 136c (as described above for wink detect). The microprocessor controller 136 will then use output port 136a to activate DTMF generator 192 to send the digits of the original extension number it received from the originating PBX 112 to the PBX 118 in DTMF. The program in FIG. 3D shows a flow chart of the program to send the digits at the rate of 100 ms tone on and 100 ms tone off. The microprocessor controller 136 uses output port 136b via lines 142 to activate relay driver 150 to deactivate relay 152 and thus connect the originating PBX E&M and tip and ring lines 114 through to the PBX E&M interface 118, and deactivate relay 154 to disconnect the adapter from drawing the current. This is also shown in FIG. 3D flow chart.

At this point the microprocessor controller 136 uses current sense circuit 206 to see if the called party hangs up. This is necessary to know when the call terminates and start looking for a new call. This is also shown in the flow chart in FIG. 3A.

What is claimed is:

1. Adapter apparatus for interfacing between a telephone central office and a private branch exchange (PBX), where said PBX also interfaces with a plurality of telephone extensions and with a voice message system, said apparatus comprising
    means for detecting and saving a called extension number sent by a central office from a calling party on a direct in dial (DID) trunk line into said PBX,
    means for detecting if the telephone extension corresponding to said called extension number is busy or does not answer,
    means, when said called extension is busy or does not answer, for holding up said DID trunk line from said central office, and terminating the call to said PBX,
    means for signaling said PBX to connect said adapter apparatus through said PBX to said voice message system,
    means for signaling said voice message system with said saved called extension number, and
    means for connecting said calling party on said DID trunk line from said central office through said PBX to said voice message system.

2. The apparatus of claim 1 wherein said means for signaling said PBX includes
    means for originating a new call request on said DID trunk line to said PBX, and
    means for signaling the extension number of a hunt group representing a group of extensions connected to said voice message system via a group of extension ports in said hunt group.

3. In an adapter for interfacing between a telephone central office and a private branch exchange (PBX) where said PBX also interfaces with a plurality of telephone extensions and with a voice message system, the method comprising the steps of
    detecting and saving a called extension number sent by said central office from a calling party on a direct in dial (DID) trunk line into said PBX,
    detecting if the telephone extension corresponding to said called extension number is busy or does not answer,
    holding up said DID trunk line from said central office when said extension is busy or does not answer, and terminating the call to said PBX,
    signaling said PBX to connect said adapter through said PBX to said voice message system,
    signaling said voice message system with said saved called extension number, and
    connecting said calling party on said DID trunk line from said central office through said PBX to said voice message system.

4. In a telephone system, including a central office, a private branch exchange (PBX), a signaling and voice connection between said central office and said PBX, a plurality of telephone extensions, and a voice message system, adapter apparatus comprising means interfacing between said connection and said PBX for detecting and saving a desired extension number of one of said telephone extensions sent by said central office from a calling party on said trunk line into said PBX, and means for permitting said calling party to be automaticlly connected to an assigned mailbox in said voice message system corresponding to said desired extension number when the desired telephone extension is busy or does not answer.

5. The apparatus as in claim 4 wherein said connection is a direct in dial trunk line.

6. Adapter apparatus for interfacing between an originating private branch exchange (PBX) or tandem switch connected to a destination private branch exchange (PBX) using an E&M tie trunk line where said destination PBX interfaces with a plurality of telephone extensions and with a voice message system, said apparatus comprising means for detecting and saving a called extension number sent by said originating PBX on said E&M tie trunk line from a calling party into said destination PBX, means for detecting if a telephone extension corresponding to said called extension is busy or does not answer, means, when said called extension is busy or does not answer, for holding up said E&M tie trunk line from said originating PBX, and means to terminate the call to said PBX, means for signaling said destination PBX to connect said adapter through said destination PBX to said voice message system, means for signaling said voice message system with said saved called extention number, and means for connecting said calling party on said E&M tie trunk line from said originating PBX through said destination PBX to said voice message system.

7. The apparatus of claim 6 wherein said means for signaling said destination PBX includes means for originating a new call request on said E&M tie trunk line to said destination PBX, and means for sending the extension number of a hunt group representing a group of extensions connected to said voice message system connected to said destination PBX via a group of extension ports in said hunt group.

8. In an adapter for interfacing between an originating PBX or tandem switch and a destination private branch exchange (PBX) where said destination PBX also interfaces with a plurality of telephone extensions and with a voice message system, the method comprising the steps of detecting and saving an extension number sent by said originating PBX from a calling party on an E&M tie trunk line into said destination PBX, detecting if the telephone extension corresponding to said called extension number is busy or does not answer, holding up said E&M tie trunk line from said central office when said called extension number is busy or does not answer, and terminating the call to said destination PBX, signaling said destination PBX to connect said adapter through said destination PBX to said voice message system, signaling said voice message system with said saved called extension number, and connecting said calling party on said E&M tie trunk line from said central office through said destination PBX to said voice message system.

9. Apparatus for use in a telephone system, including an originating private branch exchange (PBX) or tandem switch, a destination private branch exchange (PBX), a signaling and voice connection between said originating PBX or tandem switch and said destination PBX, a plurality of telephone extensions, and a voice message system, said apparatus comprising means interfacing between said connection and said destination PBX for detecting and saving a desired extension number of one of said telephone extensions sent by said originating PBX or tandem switch from a calling party on said connection into said destination PBX, and means for permitting said calling party to be automatically connected to an assigned mailbox in said voice message system corresponding to said desired extension number when the desired telephone extension is busy or does not answer.

10. The apparatus as in claim 9 wherein said connection is an E&M tie trunk line.

* * * * *